UNITED STATES PATENT OFFICE.

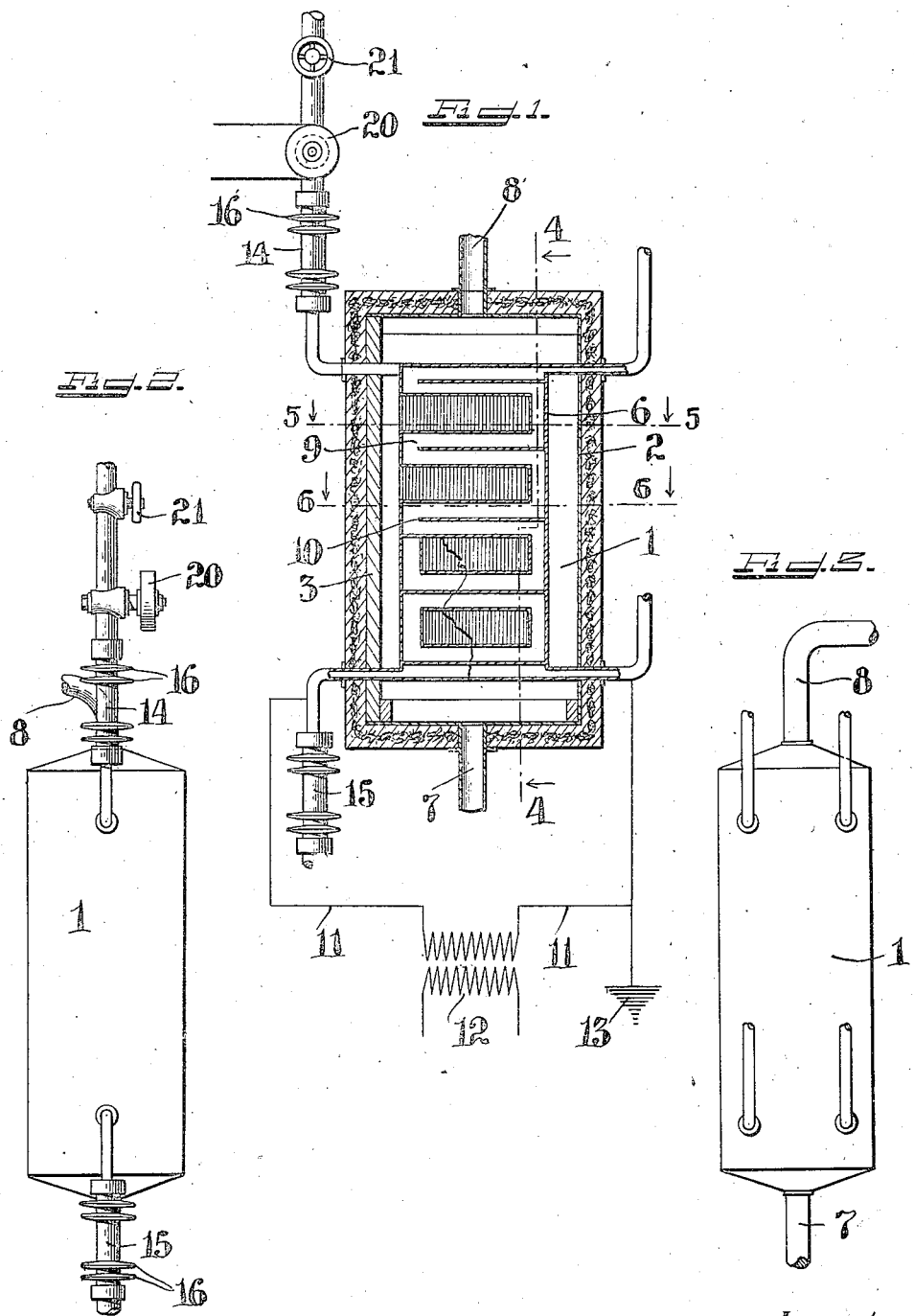

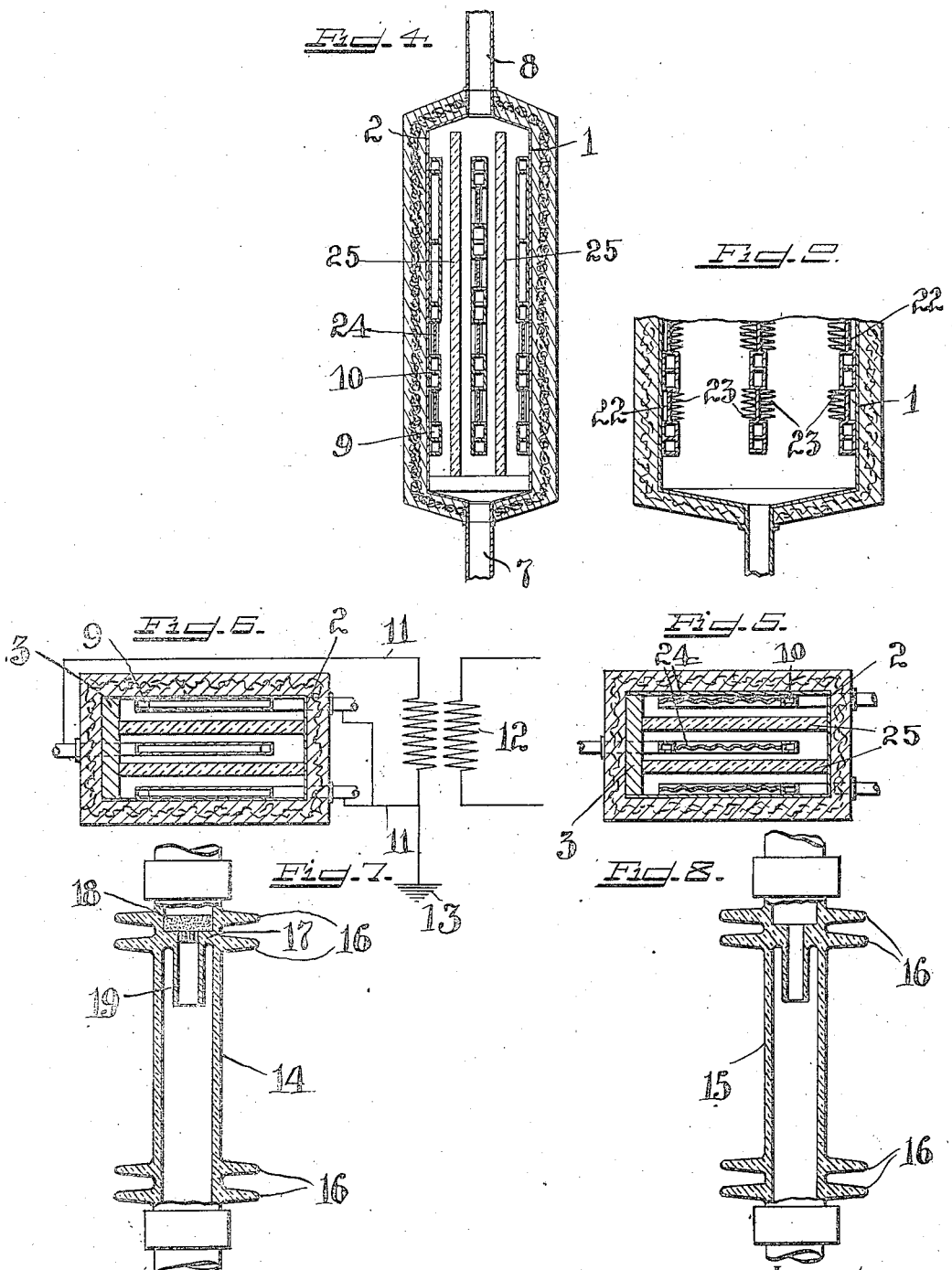

JAN STEYNIS, OF NEW YORK, N. Y.

APPARATUS FOR THE PRODUCTION OF OZONE.

No. 906,081.  Specification of Letters Patent.  Patented Dec. 8, 1908.

Application filed January 24, 1908. Serial No. 412,378.

*To all whom it may concern:*

Be it known that I, JAN STEYNIS, a subject of the Queen of the Netherlands, and residing at New York, county of New York, and State of New York, have invented certain new and useful Improvements in Apparatus for the Production of Ozone, of which the following is a full, clear, and complete disclosure.

The object of my invention is to provide an apparatus in which silent or streaming discharges of electricity are used, and in which all the heat developed by such discharges is absorbed and carried away by the action of hollow electrodes, between which the discharges take place. This cooling of the electrodes is preferably accomplished by the use of a gas that is liquefied by compression and then allowed to expand within the electrodes so as to absorb the heat generated between them, in a manner similar to that in refrigerating or cooling systems.

A further object of my invention is to produce an apparatus which is not only efficient in the small amount of electric power consumed per gram of ozone generated, but which may also permit of the treatment of large quantities of gas through the employment of comparatively heavy electric currents, thereby obtaining a large quantity of the product for a given size of apparatus. This results from the rapid cooling effect which keeps the temperature of the gas sufficiently low to prevent the formation of arcs. Thus I have found that my improved apparatus will generate 80 grams of ozone per kilowatt hour of energy used, with a concentration of 3.4 grams of ozone per cubic meter of air treated, and I have been enabled to use current as high as .5 ampere with electrodes having 1.4 square meters of surface, without undue heating of the apparatus.

The electric current and the cooling medium are easily and accurately controllable, so that the apparatus may be quickly brought to a steady and uniform action and the temperature maintained in equilibrium so that the product is constant in quantity and uniform in quality.

For a detailed description of the two forms of my invention which I at present deem preferable, reference may be had to the following specification and to the accompanying drawings forming a part thereof, in which Figure 1 is a vertical sectional view of one form of the apparatus, which I consider a preferred form; Fig. 2 is a vertical elevation of one side thereof; Fig. 3 is a vertical elevation of the opposite side thereof; Fig. 4 is a vertical sectional view taken substantially on the line 4—4 of Fig. 1; Fig. 5 is a horizontal sectional view taken substantially on the line 5—5 of Fig. 1; Fig. 6 is a horizontal sectional view taken substantially on the line 6—6 of Fig. 1; Figs. 7 and 8 are sectional views showing details of the devices for insulating the inflow and outflow conduits and Fig. 9 is a partial vertical section of a modified form of my improved generator.

In the drawing the numeral 1 indicates a rectangular receptacle or chamber, preferably having metallic sides, 2, except where the conduits pass through the same and have a high difference of potential, and such parts in said receptacle through which the charged conduits pass are preferably made of marble or some similar non-conducting material as indicated at 3. The receptacle thus formed is inclosed in some non-conducting envelop 4 such as cork, for preventing the heat of the atmosphere from entering the receptacle. The lower portion of the chamber is provided with an inlet, 7, through which the gas being treated enters, and at its opposite end the chamber is provided with an outlet, 8, through which the ozone is discharged.

The electrodes between which the silent or streaming discharges take place, comprise a series of flat tubes, 9, preferably formed out of flat metal folded or bent into a rectangular form and are so arranged as to give a zig-zag path to the cooling medium as it passes from one end of the electrode to the other. This may be accomplished by inserting dividing plates or strips as indicated at 10. Between the successive horizontal portions of these tubes corrugated iron plates 24, are inserted, which are attached firmly to the tubes so as to form a firm and rigid unitary electrode. I preferably use three electrodes thus formed, placing one on each vertical side of the chamber, 1, and interposing the other equidistant between the same, as clearly indicated in Figs. 4 and 5. Between these electrodes I preferably place a dielectric partition in the form of vertical plates 25, and these are made of any substance having a good specific inductive capacity, such as glass. These dielectric plates extend from end to end of the chamber, 1, but do not extend completely to the top or bottom, thereby leaving passages around their ends. The horizontal passages at each end of these hollow electrodes communicate with inlet and discharge pipes, whereby the liquefied gas may be introduced and the gas then drawn off when the same has expanded and absorbed the heat generated between the electrodes. The current for producing the electrical discharges for the generation of ozone is carried to these outlet or inlet conduits by means of suitable conductors indicated at 11, which lead from a suitable transformer, 12, connected with a source of alternating current. One of the terminals of the secondary coil of this transformer is preferably grounded, as indicated at 13, so that one set of electrodes (in this case the two outer electrodes) may always have the same potential as the ground, and thus obviate the necessity of insulation. The other electrode (in this case the central one) must, of course, be insulated, since it is connected to the other terminal of the secondary coil of the transformer. This is accomplished by placing in the inlet and outlet conduits insulating sleeves or cylinders, indicated at 14 and 15. These are preferably made of porcelain or similar non-conducting material, and are provided on their exterior surfaces adjacent their ends with flanges, 16, for the purpose of causing a long path of discharge having reëntrant angles, such as are often employed on supporting insulators for electrical conductors. The upper porcelain sleeve is provided with an inner partition, 17, having a number of holes or passages therein. Above this partition, I place a porous substance, 18, for causing the flow through the inlet conduit to be as uniform as possible. The lower side of the partition, 17, in the porcelain sleeve, 14, is provided with a cylindrical flange or mouth piece, 19, located concentrically with the inner surface of the sleeve. This is for the purpose of causing the liquid passing through the sleeve to be confined to its central portion without adhering to the sides of the sleeve, and thereby preventing the passage of electricity.

The porcelain sleeve, 15, connected with the outlet electrode is similar to the porcelain sleeve 14, with the exception that it has no perforated partition and it has no porous substance therein. In the form of apparatus shown in Figs. 1–6, inclusive, the central electrode is the one which is insulated by having the porcelain sleeves inserted in the inlet and outlet conduits.

In view of the fact that when a continuous stream or flow of the liquefied gas is introduced through the inlet conduit an electrical connection would be established through the same, it is necessary to supply the gas in separate and independent portions. This is accomplished by inserting in the inlet conduit connected with the central electrode a rotary interrupting valve, 20, which allows the liquefied gas to pass into the porcelain insulating sleeve as separate and practically insulated bodies, thereby preventing the current from being conducted along with the stream of the inflowing liquid. A second valve or cock is also provided in the inlet tube, as indicated at 21, for the purpose of regulating the quantity of liquefied gas supplied to the apparatus.

In the construction above pointed out, it should be noted that the electrodes are of one unitary piece, and the joints are preferably banded so as to make it impossible for the gas to leak from the electrodes within the apparatus. It will, therefore, be seen that the apparatus for producing the discharges consists of electrodes forming efficient freezing or refrigerating chambers which act very rapidly owing to the short distances between the electrodes, thereby rapidly absorbing the heat produced by the electric discharges. The arrangement of valves shown also makes it possible to vary the temperature within wide limits by regulating the amount of the refrigerating medium admitted. The rapid and efficient cooling of these electrodes enables a large amount of electric energy to be used, and consequently a large amount of ozone may be produced by a comparatively small apparatus, resulting in increased efficiency of the whole system. The gas to be submitted successively to the discharges between the electrodes should preferably be dried beforehand in any suitable manner, such as by passing the same through a freezing chamber to deposit the moisture.

The gas which passes between the electrodes is acted upon by the discharges between the first pair of horizontal tubes in the electrodes, where it becomes partly converted into ozone, then passes between the corrugated strips and is thereby cooled. The gas is then acted upon by the discharges between the next pair of horizontal tubes, and is thereby further converted into ozone, where it again tends to become heated but it is cooled by the corrugated surfaces. This action continues as the gas passes through the ozone generator, and it will be seen resembles a series of heatings and coolings in successive steps or cascades. This prevents the gas from becoming abnormally hot and aids in maintaining its low temperature and resistance to the passage of electric discharges, and prevents the forming of arcs.

The gas being in motion during its circulation through the apparatus constitutes a medium for transmitting the cooling action of the electrodes to dielectric plates, thereby preventing said plates from being raised above the limit of temperature to which a dielectric material may be submitted.

In the modification shown in Fig. 9, the dielectric plates are omitted, and instead of the corrugated plates, the plates between the horizontal tubes of the electrode are flat, as indicated at 22, and are provided with series of small pins or projections 23, which project slightly beyond the adjacent surfaces of the hollow electrode. The fact that there are no dielectric plates between the electrodes requires that the electrodes be separated to a greater distance than when the dielectric plates are used, in order to prevent the formation of arcs. In this form of the apparatus, the discharge takes place between the points of the projections or pins, and the cooling effect is obtained by the adjacent surfaces of the hollow electrodes; otherwise the action is the same as in the form of apparatus first described.

In prior apparatus having uninterrupted regions of discharge between pairs of electrodes, an arc tends to form by reason of the diminished resistance of the gas owing to its low specific heat and its consequent progressive and rapid increase of temperature in passing through the continuous discharge. In my improved apparatus this tendency is eliminated, because the temperature rises, if to any appreciable extent, only 3 or 4 degrees centigrade in passing each strata of discharges, and further rise is always prevented by the successive action of the cooling devices upon the gas. These features of operation and construction of my improved apparatus result not only in maintaining the operation of the whole device in equilibrium so that when once started adjustment of the supply of gas, cooling medium and the current is not necessary, but also results in maintaining the progress in chemical equilibrium. That is to say, the gas being treated passes through the apparatus at a substantially constant and even temperature, which temperature may be maintained at such a point to produce the highest degree of concentration and the highest efficiency in the apparatus, it having been found that there is a definite relation between the temperature and pressure of the gas when the concentration or the highest production of the ozone is at a maximum for any given temperature and pressure. The successful maintaining of a substantially constant temperature during the passage of the gas in the apparatus depends not only upon the cooling of the electrodes, but upon the cooling of the gas itself, and also upon the cooling of the dielectric plates when such are used. This triple cooling effect has heretofore never been accomplished, although attempts have been made in some instances in the prior art to cool electrodes by their contact with water, and in other instances to cool the gas by passing the same through cooling tubes, but in all of these cases the gas issues from the apparatus at a higher temperature than when it enters the same, or is subjected to a high temperature at some point in its passage through the apparatus. Since a high efficiency of the apparatus and a large percentage of concentration requires that the gas be subjected to a uniformly low temperature, determined by a definite pressure, the efficiency of such prior apparatuses is only that corresponding to the highest temperature to which the gas is subjected. My improved apparatus and process therefore appear to be the first instance in the art in which a positive equilibrium is maintained, whereby a high percentage of the production of ozone results owing to the uniform low temperature of the gas, of the electrodes and of the dielectric plates.

The above-mentioned features of my invention permit the gas being treated to be passed through the discharge spaces between the electrodes at a low speed, thereby making very high concentrations possible.

In both forms of this apparatus, the efficiency of the system is very high, owing to the high efficiency of commercial apparatus for producing cold or refrigeration, such as are used in my improved generators.

Having thus described these forms of my invention, I do not desire to be limited to the exact details of form and arrangement pointed out, but

What I claim and desire to protect by Letters Patent is:

1. In an ozonizer employing streaming discharges, hollow electrodes, means for producing the expansion of a liquefied gas within said electrodes for absorbing the total heat developed by the streaming discharges.

2. In an ozonizer employing streaming discharges, tubular metallic electrodes, means for causing the cooling medium to expand therein, and means for conducting a gas to be treated between said electrodes.

3. In an ozonizer employing streaming discharges, hollow electrodes having transverse parallel discharge portions, metallic cooling or radiating devices between said discharge portions, and means for conducting a gas to be treated between said electrodes.

4. In an ozonizer employing streaming discharges, electrodes having passages therein for the cooling medium, and having alternate raised electric discharge portions and depressed cooling portions, dielectric plates between said electrodes, and means for conducting the gas to be treated between said electrodes.

5. In an ozonizer employing streaming discharges, hollow electrodes having transverse-horizontal conduits in which the cooling medium circulates, metallic plates between said horizontal conduits and connecting the walls of the same, thereby forming rigid unitary electrodes, and means for conducting the gas to be treated between said electrodes.

6. In an ozonizer employing streaming discharges, hollow electrodes in which the cooling medium circulates, dielectric plates between the electrodes of opposite polarity and means for conducting the gas to be treated between said electrodes.

7. In an ozonizer employing streaming discharges, hollow electrodes having transverse-parallel passages therein, corrugated metallic plates in the spaces between said passages, dielectric plates between the electrodes of opposite polarity, and means for conducting the gas to be treated between said electrodes.

8. In an ozonizer employing streaming discharges, hollow electrodes through which the cooling medium passes, conduits connected with said electrodes, means for preventing the passage of electric current through said conduits comprising a liquid interrupter, and insulated sleeves interposed between said interrupter and the electrode and between the electrode and the discharge conduit.

9. In an ozonizer employing streaming discharges, hollow electrodes, means for supplying a cooling liquid to said electrodes, said means comprising a rotary interrupting valve, an insulated sleeve in said conduit between said valve and the electrode, said sleeve having an interior downwardly projecting tube, for the purposes set forth.

10. In an ozonizer employing streaming discharges, tubular electrodes, means for supplying a cooling liquid to said electrodes comprising an inlet conduit, an insulating sleeve in said conduit, a rotary interrupting valve in said conduit beyond said sleeve and a body of porous material located in said conduit, substantially as and for the purpose set forth.

11. In an ozonizer employing streaming discharges, hollow electrodes having passages through which a cooling medium may expand or evaporate, an inlet conduit connected with an electrode, an expansion valve therein, a rotary interrupting valve and an insulating sleeve located between said interrupting valve and the electrode, a discharge conduit and an insulating sleeve in said discharge conduit.

12. In an ozonizer employing streaming discharges, the combination with an electrical discharge apparatus, of cooling devices for the electrodes of said discharge apparatus, means for causing the discharges to be established in successive strata or bands between each pair of electrodes and means for cooling the treated gas between each stratum or band of discharge.

13. In an ozonizer employing streaming discharges, the combination with an electrical discharge apparatus of conduits carried by the electrodes of said discharge apparatus, means for causing the expansion of a compressible fluid in said conduits, means for causing the discharges to be established in successive strata or bands between each pair of electrodes, and means for cooling the treated gas between each stratum or band of discharge.

Signed at New York, State of New York, this 23rd day of January, 1908.

JAN STEYNIS.

Witnesses:
JAMES J. COSGROVE,
EDWARD W. VAILL, Jr.